US011234078B1

(12) United States Patent
Silfvast et al.

(10) Patent No.: US 11,234,078 B1
(45) Date of Patent: Jan. 25, 2022

(54) OPTICAL AUDIO TRANSMISSION FROM SOURCE DEVICE TO WIRELESS EARPHONES

(71) Applicant: Apple Inc., Cupertino, CA (US)

(72) Inventors: Robert D. Silfvast, Belmont, CA (US); Tushar Gupta, San Mateo, CA (US); Jahan C. Minoo, San Jose, CA (US); Nicholas C. Soldner, Mountain View, CA (US); Daniel Javaheri-Zadeh, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/912,461

(22) Filed: Jun. 25, 2020

Related U.S. Application Data

(60) Provisional application No. 62/867,802, filed on Jun. 27, 2019.

(51) Int. Cl.
*H04R 5/033* (2006.01)
*H04R 5/04* (2006.01)
*H04R 1/10* (2006.01)
*H04S 1/00* (2006.01)
*H04B 5/00* (2006.01)
(Continued)

(52) U.S. Cl.
CPC ........... *H04R 5/033* (2013.01); *G02B 27/017* (2013.01); *H04B 5/0006* (2013.01); *H04B 10/1141* (2013.01); *H04R 1/1008* (2013.01); *H04R 5/04* (2013.01); *H04S 1/007* (2013.01);
(Continued)

(58) Field of Classification Search
CPC ............. G02B 27/017; H04B 10/1141; H04B 5/0006; H04B 10/116; H04B 10/40; H04B 10/615; H04B 10/616; H04B 10/25759; H04W 4/80; H04R 5/04; H04R 5/033; H04R 2420/07; H04R 2499/11; H04R 23/008; H04R 1/1008; H04S 1/007
USPC ....... 381/74, 328, 77, 172, 315, 326, 1, 124, 381/300, 370, 6, 79; 398/135, 128, 130; 455/41.2, 91, 69
See application file for complete search history.

(56) References Cited

U.S. PATENT DOCUMENTS 5,748,813 A * 5/1998 Cassidy ............. H04B 10/1149
385/24
5,818,814 A * 10/1998 Testani ................. H04B 10/114
370/212
(Continued)

OTHER PUBLICATIONS

Salomatina et al., "Evaluation of the in vivo and ex vivo optical properties in a mouse ear model", Physics in Medicine and Biology, May 1, 2008, vol. 53, No. 11, pp. 2797-2807.

*Primary Examiner* — Norman Yu
(74) *Attorney, Agent, or Firm* — Womble Bond Dickinson (US) LLP

(57) ABSTRACT

A system that includes an audio source device configured to obtain audio data of at least one audio channel of a piece of program content. The audio source device has an optical transmitter for transmitting the audio data as an optical signal and a radio frequency (RF) transceiver. The system also includes a wireless earphone that has an optical receiver for receiving the audio data as the optical signal, a RF transceiver for transmitting feedback data indicating a reception quality of the received optical signal at the wireless earphone as a wireless RF signal, and a speaker for outputting the audio data contained within the optical signal and/or the data packets as sound.

22 Claims, 7 Drawing Sheets

(51) Int. Cl.
*H04W 4/80* (2018.01)
*G02B 27/01* (2006.01)
*H04B 10/114* (2013.01)

(52) U.S. Cl.
CPC ........... *H04W 4/80* (2018.02); *H04R 2420/07* (2013.01); *H04R 2499/11* (2013.01)

(56) References Cited

U.S. PATENT DOCUMENTS

| | | | |
|---|---|---|---|
| 10,277,316 B1* | 4/2019 | Sedillo | A61F 11/14 |
| 2008/0089539 A1* | 4/2008 | Ishii | H04R 1/1041 |
| | | | 381/311 |
| 2008/0318518 A1* | 12/2008 | Coutinho | H04H 20/62 |
| | | | 455/3.06 |
| 2011/0116750 A1* | 5/2011 | Terlizzi | G02B 6/3817 |
| | | | 385/88 |
| 2011/0230137 A1* | 9/2011 | Hicks | H04L 12/2838 |
| | | | 455/41.2 |
| 2018/0152781 A1* | 5/2018 | Boyer | H03G 3/14 |

* cited by examiner

OPTICAL AUDIO TRANSMISSION FROM SOURCE DEVICE TO WIRELESS EARPHONES

CROSS-REFERENCE TO RELATED APPLICATION

This application claims the benefit of and priority to U.S. Provisional Patent Application Ser. No. 62/867,802, filed Jun. 27, 2019, which is hereby incorporated by this reference in its entirety.

FIELD

An aspect of the disclosure relates an audio source device that transitions between transmitting audio data as an over-the-air optical signal to an earphone, to transmitting the audio data as an over-the-air radio frequency (RF) signal. Other aspects are also described.

BACKGROUND

Headphones is an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Headphones and earphones are normally wired to a separate playback device, such as a digital audio player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is a method performed by an audio source device (e.g., a head-mounted device (HMD)) to wirelessly transmit audio data via an over-the-air optical transmitter to an audio receiver device (e.g., wireless earphone). The audio source device obtains audio data of user-desired audio content (e.g., music), and the over-the-air optical transmitter transmits the audio data as an optical signal that is received (or sensed) by an optical receiver of the wireless earphone, which then uses the obtained audio data to drive a speaker.

In one aspect of the disclosure, the audio source device may transmit audio data via an over-the-air optical transmitter and an over-the-air radio frequency (RF) transmitter. Specifically, the audio source device may transmit low-latency audio data over the optical signal that has low-latency requirements, such as audio feedback, using the optical transmitter, and may transmit high-latency audio data over a wireless RF signal that does not have low-latency requirements (or is low-latency agnostic), such as a musical composition, using the RF transceiver. Upon obtaining the audio data, the audio receiver device may mix the audio data to produce a mix that is to be used to drive the speaker of the device. In another aspect, the audio receiver device may receive the high-latency audio data over the wireless RF signal from another audio source device.

Optical audio transmission may be susceptible to changes in environmental conditions. For instance, to wirelessly transmit audio data as an optical signal, the optical transmitter of the audio source device may require a line of sight to the optical receiver of the wireless earphone. If this line of sight is obstructed (e.g., by a user's hand), the audio receiver device will be unable to receive audio content. To avoid playback interruptions that may be caused in such a case, the audio source device is configured to transition between wireless connections. For instance, while transmitting audio data via the over-the-air optical transmitter, the audio source device determines whether a reception quality of the optical signal is below a threshold, which may be indicative of the optical signal being obstructed. If so, the audio source device transitions from transmitting the audio data optically to transmitting the audio data as a wireless RF signal via any wireless protocol (e.g., BLUETOOTH protocol).

In one aspect, the audio receiver device may include a RF transceiver for transmitting feedback data indicating the reception quality of the received optical signal at the receiver device as a wireless RF signal, where the receiver device is configured to adjust optical transmission based on the feedback data. For example, the audio source device may be a HMD and the audio receiver device may be a wireless earphone (e.g., earbud), which while worn by the user, the optical transmitter is positioned on one side of a pinna of one of the user's ears and the optical receiver is positioned on another side of the pinna. The optical transmitter may be configured to produce the optical signal as modulated light (e.g., having a wavelength between 800-1150 nm), and the optical receiver may be configured to receive the optical signal by sensing the modulated light that is out-coupled through the pinna. In this case, the wireless earphone may be configured to determine the reception quality as an input optical power level of the modulated light sensed by the optical receiver, and the HMD may be configured to adjust an output power level of the optical transmitter according to the input optical power level. For example, when the input optical power level is high (e.g., above a threshold), the HMD may reduce the output power level of the optical transmitter. In another aspect, in response to the reception quality being below a threshold, the HMD may transition from using the optical transmitter to produce the optical signal as the modulated light to using another optical transmitter to produce another optical signal. As a result, the HMD may switch between optical transmitters, choosing the optical transmitter associated with the best reception quality to produce the optical signal.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the disclosure are illustrated by way of example and not by way of limitation in the figures of the accompanying drawings in which like references indicate similar elements. It should be noted that references to "an" or "one" aspect of the disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
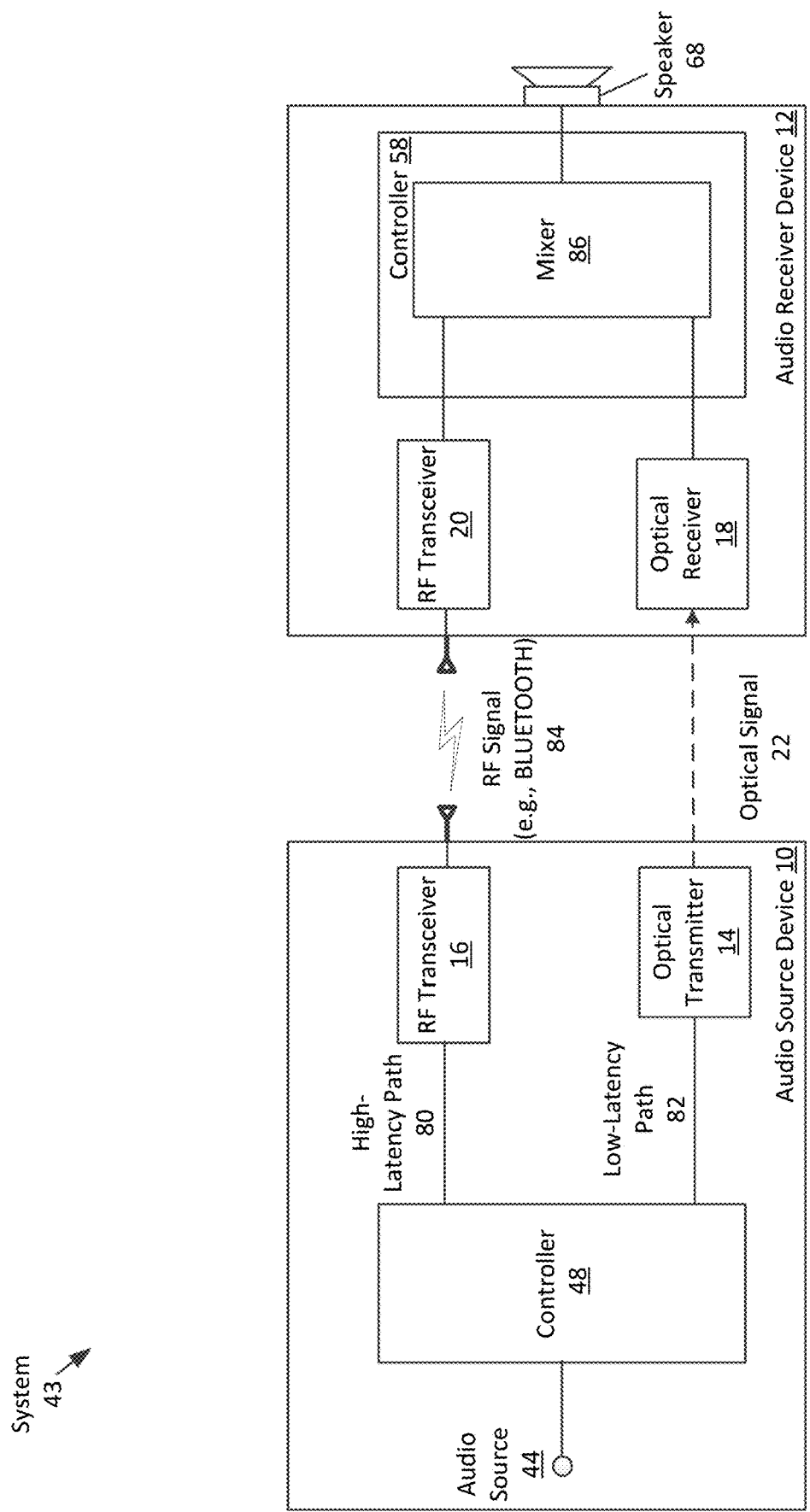
FIG. 1 is a block diagram of a system for transmitting audio data via an optical transmitter and via a radio frequency (RF) transceiver according to one aspect of the disclosure.

Several aspects of the disclosure with reference to the appended drawings are now explained. Whenever the shapes, relative positions, and other aspects of the parts described in the aspects are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description. In one aspect, ranges disclosed herein may include any value (or quantity) between end point values and/or the end point values.

Wireless communication capabilities are available in a broad array of accessory devices that can be configured to communicate with audio source devices. For example, wireless audio output devices, such as a wireless headset or a pair of wireless earphones, can connect via a wireless personal area network (WPAN) connection to an audio source device, such as a smart phone, in order to receive an audio stream. In one aspect, the WPAN connection may be via an Advanced Audio Distribution Profile (A2DP) connection or another audio profile connection of a BLUETOOTH communication protocol. To stream high-quality audio data, the audio source device packetizes the audio data (e.g., partitions the audio data into units for transmission) according to the A2DP profile and stores the packets of audio data in transmit buffers. Packets are then transmitted over an over-the-air (or wireless) radio frequency (RF) signal to the wireless audio output device. The received packets are stored in long buffers in the output device in order to provide continuous audio playback in situations when future packets are dropped (e.g., during transmission interference). Audio data in the buffers are de-packetized and processed for audio output through at least one speaker. This process is repeated while audio output is desired at the audio output device.

Although convenient, wireless communication protocols have latency drawbacks. For instance, streaming audio data through BLUETOOTH may require tens of milliseconds for audio processing to generate an encoded audio packet and up to a few hundred milliseconds of buffering, resulting in over 250 milliseconds of end-to-end latency. In addition, any error-correction schemes (e.g., forward error correction (FEC) code) that are used to detect errors in packets may add additional latency. This end-to-end latency may not be noticeable by a user for some audio (e.g., high-latency audio), such as a music composition because long buffers in the audio output device may maintain audio playback continuity. For example, upon initiating playback of the musical composition, the audio output device may delay playback to first fill its buffer. Once filed, audio data is retrieved from the buffer for output. Some audio (e.g., low-latency audio), however, may require a shorter latency. For example, audio associated with a physical action upon the audio source device (e.g., a selection of a user interface (UI) item on a touch screen that provides audible feedback when selected) may require a short audible response time (e.g., less than ten milliseconds). Thus, audio that is time sensitive that is transmitted via BLUETOOTH may be delayed due to the high latency, causing discontinuity between selection of the UI item and the audible feedback. This discontinuity may degrade user experience.

The present disclosure provides a method for low-latency optical audio transmission. For example, audio data may be transmitted over an over-the-air optical signal that is produced (or projected) from an audio source device to an audio output (receiver) device. Unlike wireless protocols that may require audio data be encoded and packetized (e.g., with a header, etc.), audio data transmission via an optical signal may be transmitted as raw digital data (e.g., uncompressed). This type of transmission may reduce the end-to-end latency considerably, since there is no additional latency due to audio processing (e.g., compression/encoding of the audio source device) at the source device and latency due to audio processing (e.g., decompression) at the audio output device is required. With the reduction of latency, the output device may output audio feedback nearly instantaneously in response to user interactions with the source device. In other words, the present disclosure may reduce latency, such that output of audio feedback is perceived by a user to be (practically) instantaneous to when a UI item is selected. More about the differences between wireless protocols and the low-latency optical-audio transmission is described herein.

In another aspect, the present disclosure provides a method for the audio source device to transition between at least two audio transmission methods. For instance, if an over-the-air optical signal is interrupted or the reception quality degrades below a threshold during optical audio transmission, the source device may transition from optical audio transmission to a wireless protocol transmission, such as BLUETOOTH. More about how the transition occurs is described herein.

FIG. 1 shows a block diagram of a computer audio system (or system) 43 for transmitting audio data via an optical transmitter and via a RF transceiver according to one aspect of the disclosure. Specifically, the system 43 includes an audio source device 10 and an audio receiver device 12. As used herein, an "audio source device" may be any electronic device that is capable of transmitting audio data via at least one optical transmitter 14 and/or a (first) RF transceiver 16. Examples of such devices may include a computer monitor, a television (e.g., a smart TV), a set-top box, a smart speaker, and a digital media player. As another example, the audio source device 10 may be any portable electronic device that includes at least one optical transmitter and/or a RF transceiver, such as a laptop computer, a tablet computer, a head-mounted device (HMD), such as smart glasses, a wearable device (e.g., a smart watch), and a smartphone.

As used herein, "audio receiver device" may be any electronic device that is capable of obtaining audio data via an optical receiver 18 and/or a (second) RF transceiver 20, and is capable of outputting the audio data through at least one speaker as sound. For instance, the audio receiver device 12 may be portable wireless in-ear (e.g., earphones or earbuds), on-ear, or over-the-ear headphones that include at least one speaker that is configured to output sound into a user's ear (ear canal). In another aspect, the audio receiver device 12 may be a part of a HMD, such as a helmet, eye glasses, or a pair of headphones (e.g., composed of a bridge to which left and right earcups are attached). In this case, the receiver device 12 may be configured to produce stereophonic sound, where a left audio channel is used to drive a speaker in the left ear cup, while a right audio channel is used to drive a speaker in the right ear cup. In another aspect, the audio receiver device may be the same (or similar) device as the audio source device, and vice a versa.

In one aspect, the audio receiver device 12 may be communicatively coupled with the audio source device 10, via an over-the-air (or wireless) connection, pairing the source device 10 with the receiver device 12. During this established connection with the source device, the receiver device may receive audio data for playback through one or more speakers. In another aspect, both devices may exchange (audio) data via one or more transmission paths. For instance, as described herein, the receiver device may be communicatively coupled via the transmission of an optical signal 22 and/or via the transmission of an RF signal 84 that uses any wireless protocol, such as BLUETOOTH protocol.

The audio source device 10 includes an audio source 44, a controller 48, a RF transceiver 16 and an optical transmitter 14. The optical transmitter 14 is an electronic device (or component) that is configured to transmit data (e.g., audio data) as an over-the-air optical signal. This is in contrast to a fiber optical transmitter that is configured to transmit an optical signal via a fiber optical cable (or waveguide). In one aspect, the optical transmitter 14 may include a light source (e.g., a light emitting diode (LED), etc.) and drive circuitry (e.g., an optical modulator) that modulates light output (e.g., a light carrier signal produced) from the light source according to an input digital drive signal. For instance, the modulator may control an input drive current to the light source so that light is emitted from the light source when the input digital signal is high (e.g., a binary one), and no light is emitted from the light source when the input digital signal is low (e.g., binary zero). In another aspect, the optical modulator may modulate the light source according to any type of modulation, such as amplitude modulation (where the carrier signal is varied in proportion to the input signal) and wavelength modulation (where the wavelength of the carrier signal is modulated according to the input signal). In one aspect, the optical modulator may modulate the light source according to any type of input signal (e.g., an analog signal).

In one aspect, the light produced by the light source may be infrared light that has a wavelength between 700 nm-0.1 mm. For example, the optical transmitter 14 may produce the optical signal to have a wavelength between 1200-1400 nm. As another example, the optical transmitter 14 may produce the optical signal to have a wavelength between 1600-1700 nm. In one aspect, light within either (or both) of these wavelength ranges may penetrate through human hair. As another example, the optical transmitter 14 may produce the optical signal to have a wavelength between 800 nm to 1150 nm. In some aspects, light within (and including) this wavelength range may penetrate through human hair, as well as some portions of human tissue, such as the pinna of the ear, as described herein. In some aspects, the light may be any light that has a wavelength that is shorter than a shortest wavelength of radio waves (e.g., visible light, ultraviolet light, etc.). In some aspects, the light source may be configured to produce light at different wavelengths. In one aspect, the controller 48 may be configured to select a wavelength with which the optical transmitter 14 modulates light based on a presence of ambient light. For instance, the audio source device may include an ambient light sensor that detects the spectral content of ambient light. From this content, the controller 48 is configured to select one or more wavelengths (e.g., that may be less affected by the ambient light).

The RF transceiver 16 is an electronic device that is configured to transmit (and receive) data as over-the-air radio frequency waves (e.g., a wireless RF signal). The transceiver 16 may establish a wireless communication link using any wireless communication method (e.g., using BLUETOOTH protocol, a wireless local network link, etc.) with another electronic device. As described herein, upon establishing the link with another device (e.g., via a RF transceiver 20), the audio source device is configured to exchange data packets (e.g., Internet Protocol (IP) packets, Asynchronous Connection-Less (ACL) packets, A2DP packets, etc.), where each packet contains at least a portion of the audio data.

The audio receiver device 12 includes an optical receiver 18, a RF transceiver 20, a controller 58, and at least one speaker 68. The optical receiver 18 is configured to obtain (or sense) an over-the-air optical signal that contains data. In one aspect, the optical receiver 18 may include one or more photo sensors (or photodiodes) that are each configured to sense the (modulated) light produced by the optical transmitter 14 and produce an electrical signal (e.g., digital or analog) according to the sensed light. In one aspect, each of the photo sensors may be configured to sense the same wavelengths of light. In another aspect, at least some of the photo sensors may be configured to sense different wavelengths of light than other sensors of the optical receiver. The receiver 18 may also include a demodulator that recovers data from the modulated optical signal. More about operations performed by the optical receiver 18 (and transmitter 14) is described herein. Similar to transceiver 16, the RF transceiver 20 is an electronic device that is configured to transmit (and receive) data as an over-the-air wireless RF signal that contains data therein. In this case, the transceiver 20 may be configured to establish a wireless RF communication link with RF transceiver 16 of the audio source device in order to exchange data. More about exchanging data is described herein.

In one aspect, either of the devices 10 and/or 12 may be configured to transmit and/or receive optical signals, as described herein. For instance, the optical transmitter 14 may be an optical transmitter/receiver (transceiver or "Tx/Rx"), where the transceiver 14 is configured to sense an optical signal (using a photo sensor) and demodulate the optical signal to produce an electrical signal. Similarly, the optical receiver 18 may be an optical transceiver. In this case, when both devices include an optical transceiver, they may be capable of two-way optical communication with one another. Otherwise, if one device only includes one optical transmitter or receiver, the devices may be capable of performing one-way (e.g., optical) communication between one another. Thus, although illustrated as including an optical transmitter or an optical receiver, either device (or both devices) may include an optical transceiver.

The audio source 44 may include a programmed processor that is running an application (e.g., a media play back application) in the audio source device 10 that is configured to request audio playback. For instance, the application may be a music application that is configured to request playback of musical compositions. In another aspect, the application may be any application that is configured to request for the source device (and/or the receiver device) to playback audio feedback (e.g., in response to user input). In some aspects, the audio source 44 may be at least one microphone that is integrated into the audio source device. In another aspect, the audio source 44 may be a separate electronic device with which the audio source device is paired (e.g., via a wireless communication link).

The controller 48 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one aspect, the controller 48 is configured to obtain a request from the audio source device (e.g., a media playback application) to playback audio content via the audio receiver device. For instance, the controller 48 may obtain the request and then route the audio data via a high-latency path 80 and/or a low-latency path 82. In one aspect, the controller 48 may obtain the audio data from the source 44 from local memory (e.g., from memory of the controller 48, and/or from a remote location, such as another electronic device). The high-latency path 80 is a path in which the audio content (or audio data) is transmitted via an over-the-air RF signal. As described herein, audio data that is transmitted over an RF signal may have a high end-to-end latency, due to buffering, etc. The low-latency path, on the other hand is a path in which audio playback is transmitted via an optical signal 22 that allows nearly instantaneous playback from the time the controller 48 transmits the audio data. In one aspect, the low-latency path 82 has a lower end-to-end latency than the high-latency path 80.

In one aspect, the controller 48 is configured to determine whether to route the audio data via the high-latency path 80 and/or the low-latency path 82. Specifically, the controller 48 determines whether the audio data has low-latency requirements (or is low-latency agnostic). For example, the request obtained by the controller 48 may deem whether the audio data has low-latency requirements, which may cause the controller 48 to route the data via the low-latency path 82 for optical transmission. In another aspect, the audio data may indicate the requirements (e.g., via metadata). In some aspects, the controller 48 may perform a contextual analysis upon the request and/or the audio data. For instance, the controller 48 may route audio data associated with a musical composition to the high-latency path 80, while routing audio feedback to the low-latency path 82. In yet another aspect, the controller 48 may obtain user input (e.g., a selection of a user interface (UI) item on a display screen of the source device) on which route should be selected. It should be understood that the controller 48 may make this determination by any method.

In some aspects, the controller 48 may route audio data to both paths (e.g., simultaneously) in order to transmit audio data via the optical transmitter 14 and the RF transceiver 16 concurrently. Specifically, the controller 48 may route similar (or the same) audio data (which has low-latency requirements) to both paths, in order for both the RF transceiver 16 and the optical transmitter 14 to transmit the audio data to the audio receiver device 12. In one aspect, the audio receiver device (the controller 58) is configured to determine whether to output audio data that is obtained from either path. For instance, as described herein, the audio receiver device may output audio data that is obtained via the optical path. However, in response to determining that the reception quality of the optical path is below a threshold, the audio receiver device may transition from outputting the audio data that is obtained from the optical receiver 18 to outputting audio data that is obtained from the RF transceiver 20.

In another aspect, the audio source device 10 may route different audio data (or audio signals) to both paths for simultaneous or almost simultaneous transmission. For example, the audio source device 10 may transmit audio data that has low-latency requirements (e.g., sounds associated with a selection of a UI item as described herein) via the optical transmitter 14, while transmitting additional audio data that does not have low-latency requirements or is low-latency agnostic, such as a musical composition, via another wireless RF method that has higher latency, such as BLUETOOTH. In this case, the controller 58 includes a mixer 86 that is configured to mix the audio signal from the optical receiver 18 with the audio signal from the RF transceiver 20 to produce a mixed (driver) signal for driving the speaker 68. In one aspect, the mixer may perform matrix mixer operations. In another aspect, the mixer 86 may perform digital and/or analog mixing.

Figure 2:
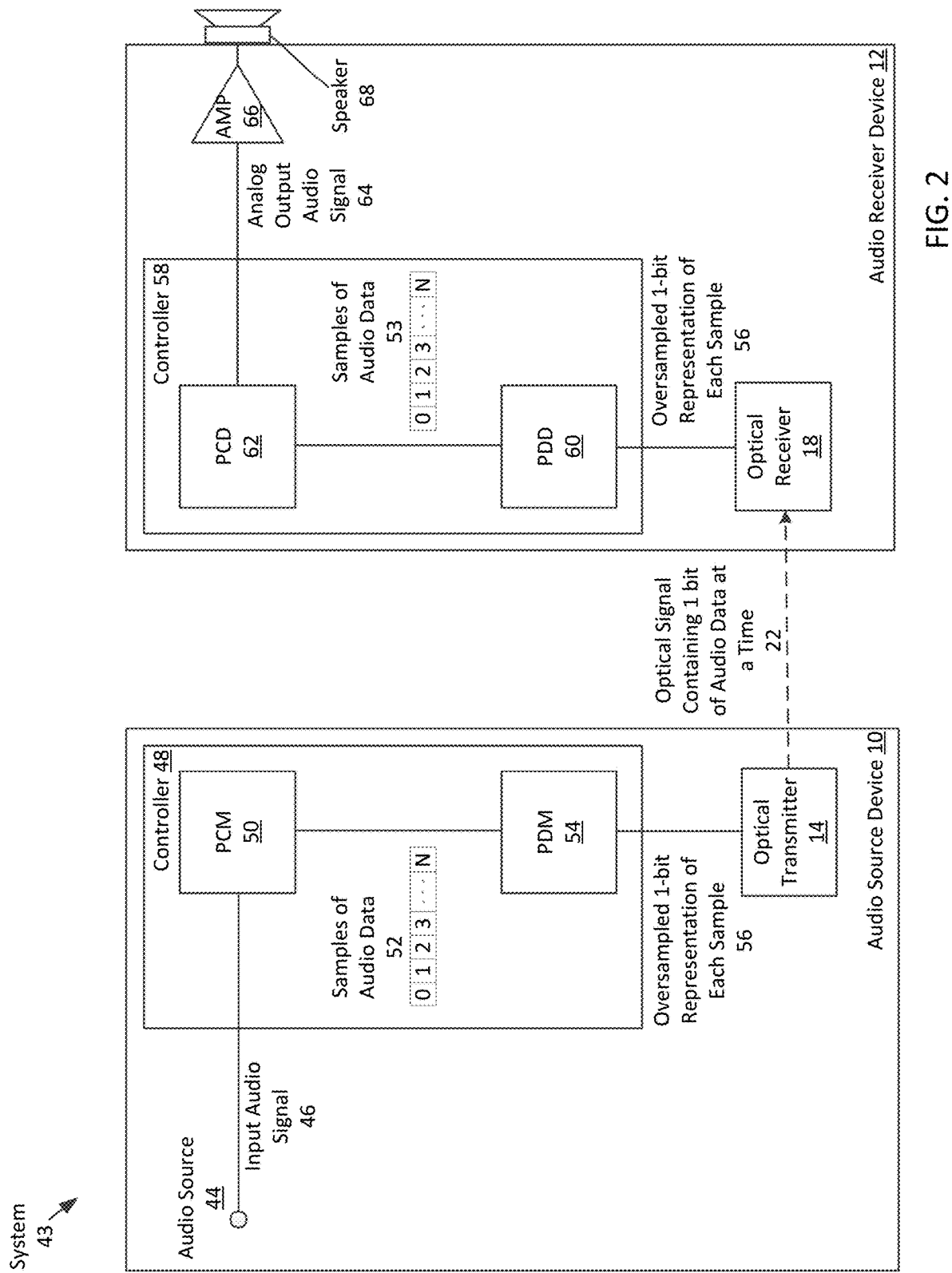
FIG. 2 is a block diagram of a system for transmitting audio data via an optical transmitter according to another aspect of the disclosure.

FIG. 2 is a block diagram of a computer audio system 43 for transmitting audio data via an over-the-air optical transmitter 14 according to one aspect of the disclosure. Specifically, this figure illustrates the process to format audio data for over-the-air optical transmission from the audio source device 10 to the audio receiver device. As described herein, this process provides a low-latency over-the-air optical audio transmission in contrast to other conventional over-the-air audio transmission protocols, such as BLUETOOTH. For instance, the optical audio transmission described herein provides a smallest self-contained unit (e.g., sample) of audio data that allows an audio output device (e.g., the audio receiver device 12) to reproduce audio content (e.g., that is transmitted from the audio source device 10) in less than a period of time. In one aspect, the period time may be 200 microseconds. In another aspect, the period of time may be between 20-100 microseconds. This is in contrast to BLUETOOTH protocol that may require hundreds of milliseconds, as described herein.

The system 43 includes the audio source device 10 and the audio receiver device 12. The audio source device 10 includes the audio source 44, the controller 48, and the optical transmitter 14. The audio receiver device 12 includes the optical receiver 18, the controller 58, an amplifier (AMP) 66 and the speaker 68. In one aspect, the system 43 may include a separate electronic device (not shown) that is configured to establish a wireless communication link with the audio source device, such as a laptop computer, desktop computer, etc., over a wireless computer network. During the established wireless connection, the audio source device 10 may exchange (e.g., transmit and receive) data, such as audio data. In another aspect, the communication link may be a wired link.

The controller is configured to receive an input audio signal 46 from the audio source 44. In one aspect, the input audio signal may be a single audio channel (e.g., mono), or it may include a two or more audio channels, such as a left audio channel and a right audio channel that may represent a musical composition that has been recorded stereophonically. Alternatively, there may be more than two audio channels. In one aspect, the input audio signal 46 may be an analog audio signal. In another aspect, the input audio signal 46 may be a digital audio signal. In one aspect, the controller 48 may perform audio signal processing operations upon the input audio signal 46. For example, the controller 48 may perform spectral shaping (e.g., equalization) or dynamic range control upon some of the input audio signal 46.

The controller 48 includes a pulse-code modulator (PCM) 50 and a pulse-density modulator (PDM) 54, which are configured to format the input audio signal 46 for optical audio transmission according to one aspect of the disclosure. Specifically, the PCM 50 is configured to receive the (analog) input audio signal 46 and perform analog-to-digital conversion to represent the signal 46 as a series of multi-bit samples 52. For instance, each sample 52 may have a sample depth (or word length) of 8, 16, 20, or 24 bits. In one aspect, the PCM 50 may sample the input audio signal 46 at any sampling frequency, such as 48 kHz or 44.1 kHz.

The PDM 54 is configured to receive each sample 52 from the PCM 50 and produce a digital driver signal 56 to operate the optical transmitter 14 to produce an over-the-air optical signal 22. Specifically, the PDM 54 produces an oversampled 1-bit representation of each sample 56 as the digital signal by interpolating each sample 52. Such modulation reduces the word length of the sample 52 produced by the PCM 50 to a 1-bit sample. In one aspect, the PDM 54 may have a higher sampling rate than the PCM 50. As an example, the PDM 54 may have a sampling rate of 3 MHz, thereby producing 64 1-bit samples 56 for each multi-bit sample 52. As a result, each sample 56 may be approximately 300 nanoseconds long of audio data. The optical transmitter 14 receives each 1-bit sample 56 and produces an optical signal 22 containing one sample (e.g., 1-bit) of audio data at a time, as described herein. For instance, the optical transmitter 14 may modulate a carrier signal according to each bit separately. As another example, the optical transmitter 14 may pulse light according to each sample 56. In one aspect, the optical transmitter may have a data-transmission rate of at least the sampling rate of the PDM 54 (e.g., approximately 3 Mb/sec).

The optical receiver 18 of the audio receiver device 12 is configured to receive the optical signal and produce the oversampled 1-bit representation of each sample 56. The controller 58 is configured to receive each sample 56 and produce an analog output audio signal 64. Specifically, the controller 58 includes a pulse-density demodulator (PDD) 60 that is configured to produce multi-bit samples of audio data 53 from the oversampled 1-bit representation of the audio data 56. Thus, to produce each of the samples 53, the PDD 60 may need to collect several 1-bit samples 56 from the optical receiver 18. In one aspect, each of the samples 53 may be the same as the samples 52, and therefore each sample 53 may be approximately 20 microseconds long.

The controller 58 also includes a pulse-code demodulator 62 that is configured to perform digital-to-analog conversion of the samples 53 into the analog output audio signal 64. The AMP 66 is configured to receive the analog signal 64 and perform an amplification operation to produce at least one driver signal. The speaker 68 is configured to receive the driver signal from the AMP 66 and use the driver signals to produce sound. The speaker 68 may be an electrodynamic driver that may be specifically designed for sound output at a particular frequency bands, such as a woofer, tweeter, or midrange driver, for example.

The process described herein to optically transmit the audio data may have an end-to-end latency of less than 200 microseconds, as opposed to other conventional methods. This reduction of latency may be the result of performing fewer operations that are performed on the transmission side than other wireless protocols, such as BLUETOOTH. For example, with BLUETOOTH, audio data must be compressed/encoded and packetized for transmission. The present optical audio format does not require such compression or packetization. Instead, raw digital audio data is transmitted over an optical signal. In addition, the present optical audio format transmits the audio data one sample at a time (e.g., 1 bit at a time). This is in contrast to BLUETOOTH that creates data packets that may include 1.25 milliseconds of audio data (or longer).

Similarly, operations performed at the audio receiver device 12 may reduce latency as well. For instance, as opposed to BLUETOOTH that is required to store received packets in long buffers, which may result in increased latency, the present method does not require such buffers. In one aspect, the audio receiver device 12 may include a buffer that is only long enough to store one sample 53. Thus, as opposed to BLUETOOTH buffers that may be hundreds of milliseconds long, the audio receiver device 12 may include a buffer that is approximately 20 microseconds long. Furthermore, the present method may reduce latency because unlike BLUETOOTH, the audio receiver device 12 does not need to extract the audio data from a data packet and perform additional audio signal processing operations upon the data to produce the analog signal 64.

Some aspects may perform variations of the audio optical transmission method described herein. In one variation pulse-code modulation is optional (e.g., not required). For instance, the PDM 54 may receive the input audio signal 46 from the audio source 44 and perform analog-to-digital conversion to produce an oversampled 1-bit representation 56 of the signal 46. As another example, the PDM 54 may receive digital data that is processed by the controller 48 (e.g., spectrally shaped). Similarly, the audio receiver device 12 may not perform the pulse-code modulation/demodulation operations, but instead the PDD 60 may perform the digital-to-analog operations. As another variation, at least some of the modulation and demodulation operations may be performed by the optical transmitter 14 and optical receiver 18, respectively, rather than each device's respective controller.

Some aspects may perform other variations of the audio optical transmission method described herein. In another variation, pulse-density modulation is optional (e.g., not required). For instance, the optical transmitter 14 may optically transmit PCM samples 52. As described herein, each PCM sample may include several bits of data (e.g., 20 bits). In this case, the optical transmitter may serially transmit bits of each PCM sample. Once bits of each sample are received by the audio receiver device, the samples may be reconstructed by the controller 58.

In one aspect, the audio source device 10 may modulate a light carrier signal accordingly to a low duty cycle in order to conserve power. For example, when the audio source device is a portable device, such as smart glasses, the device may rely on an internal power source (e.g., one or more batteries) to operate. When optically transmitting audio data, the production of the carrier signal may draw significant power. In order to conserve power, the duty cycle may be reduced, such as between 1%-25% duty cycle. In one aspect, the modulation duty cycle may be 10%. With a low duty cycle, the light source may draw less power (then if the duty cycle were higher, such as 50%, such is the case with S/PDIF), thereby conserving battery power. In one aspect, with such a short duration of pulses, the controller 58 may include pulse-position demodulator (PPM) that is configured to recover the audio data from the transmitted optical signal.

In one aspect, the (controller 48 of the) audio source device 10 may encrypt the audio data at any stage before the data is optically transmitted to the audio receiver device 12. For example, the controller may encrypt each PCM sample 52 according to an encryption key. The audio source device transmits the PCM sample (e.g., as a series of 1-bit samples) via the optical signal to the audio receiver device 12. In addition, the audio source device 10 may transmit the encryption key to the audio receiver device 12 via the wireless RF signal. Once received, the controller 58 of the audio receiver device may decrypt the encrypted audio data using the received key. Since the audio data is transmitted via an over-the-air optical path, encrypting the audio data may prevent unauthorized users from receiving (e.g., via an optical sensor probe) and using the audio data encrypted therein. In one aspect, the system 43 may use any encryption algorithm (e.g., Advanced Encryption Standard (AES)) to encrypt the audio data.

In one aspect and as described herein, the audio source device 10 and the audio receiver device 12 may be configured to perform two-way optical communication. In this case, the audio receiver device 12 may perform the operations described herein to perform optical audio transmission, and the audio source device 10 may perform at least some of the operations described herein to receive an optical signal containing data (e.g., audio data, control data, etc.).

In some aspects, the audio receiver device 12 may include two or more speakers that may form (or be a part of) a speaker array that the audio receiver device uses to perform sound output beamforming operations. Specifically, the audio receiver device may produce driver signals (e.g., similar to signal 64) to drive the speakers to produce directional sound beam patterns towards locations within the physical environment, where each of the beam patterns contain at least some of the audio data received through the optical audio transmission. In another aspect, at least a portion of the array may include extra aural speakers that are configured to produce sound energy into the environment. In one aspect, the controller 48 may perform the beamforming operations described herein.

In one aspect, the audio source device 10 may transmit multiple audio streams as multiple optical signals to be received by the audio receiver device 12. For instance, as described herein the audio source device 10 may include one or more optical transmitters 14. As a result, the audio source device 10 may transmit audio data of a first audio signal via a first optical transmitter and transmit audio data of a second audio signal via a second optical transmitter. In one aspect, to transmit both signals, both optical transmitters may transmit the data at different wavelengths, in order to prevent interference. In another aspect, a single transmitter (e.g., 14) may transmit the optical signals at different wavelengths (e.g., wavelength division multiplexing). In another aspect, the audio source device 10 may use any known method to transmit multiple data streams, such as time-division multiplexing, etc. In one aspect, the audio receiver device 12 may receive the multiple data streams through the use of one or more optical receivers. Once received, the mixer 86 may mix the obtained audio streams to produce at least one mixed driver signal. In one aspect, the audio source device 10 may transmit the same audio data via the one or more optical transmitters 14. For instance, transmitting the same audio data via several optical transmitters may maximize the probability of the optical receiver capturing the optical signal due to differences between transmission paths. More about transmitting audio data via multiple optical transmitters 14 is described herein.

Figure 5:
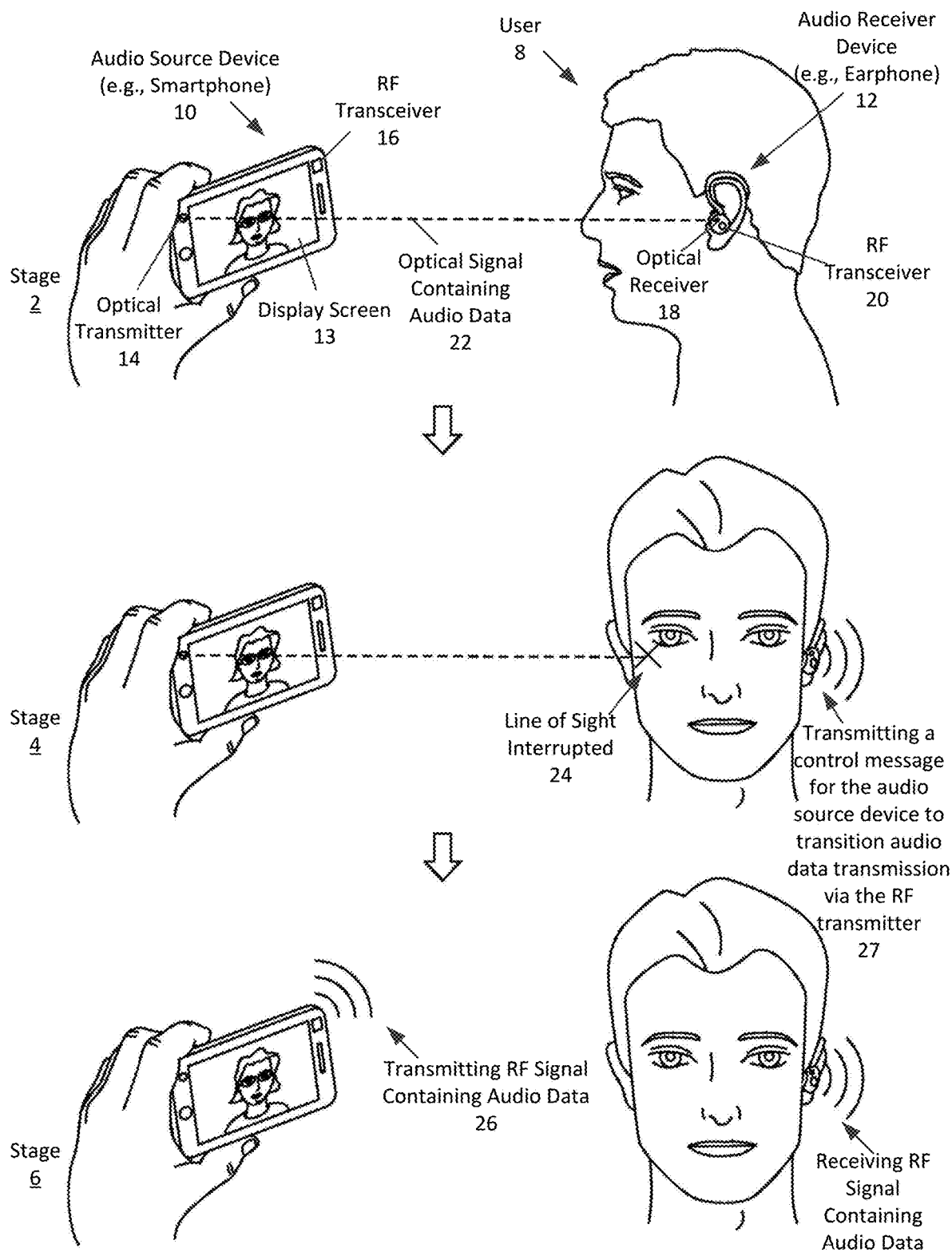
FIG. 5 shows a progression of stages of an audio source device transitioning from transmitting audio data as an optical signal to transmitting the audio data as a wireless RF signal.

In one aspect, the audio receiver device is configured to transmit at least some of the audio data received via over-the-air optical transmission to another electronic device. For example, as described herein the audio receiver device 12 may receive (or obtain) one or more audio streams via optical transmission and/or RF transmission. In one aspect, one audio stream may be a left audio channel and a second audio stream may be a right audio channel, both channels are a part of a stereophonic recording of a musical composition. Referring to FIG. 5, the audio receiver device 12 is a left audio receiver device (e.g., earphone or earbud) that is configured to output sound of a left audio channel. In this aspect, the user 8 may be wearing a second, right earphone or earbud (not shown) that is configured to output sound of the right audio channel. In one aspect, the left and right audio receiver devices may be paired to one another in order to output sound. Thus, when the audio receiver device 12 is receiving the left and right audio channel, the audio receiver device 12 may retransmit the right audio channel to the right audio receiver device in order for both audio receiver devices to (at least partially) simultaneously output sound of the piece of program content.

In one aspect, the audio receiver device 12 may transmit audio data to another electronic device (e.g., another audio receiver device) by establishing a wireless communication link, using any wireless communication method, as described herein. In one aspect, the audio receiver device 12 may transmit audio data using a near field magnetic induction (NFMI) transmitter. In another aspect, the audio receiver device 12 may use any known wireless method to transmit audio data to another audio receiver device. In one aspect, the right audio receiver device may be connected to the audio receiver device 12 via a wire.

In another aspect, when the user 8 is wearing multiple audio receiver devices, both audio receiver devices may receive audio data via separate optical signals. For instance, the left audio receiver device 12 may receive a first optical signal with audio data of a left audio channel, and a right audio receiver device may receive a second optical signal with audio data of a right audio channel. In one aspect, if one audio receiver device is obstructed, the other unobstructed audio receiver device may transmit audio data to the obstructed audio receiver device through any wireless communication method, such as BLUETOOTH, NFMI, etc.

In another aspect, the mixer 86 is configured to spatially render the received audio data (e.g., audio data obtained via the RF transmission and/or the optical transmission) by applying spatial audio filters. For example, the mixer 86 may perform binaural rendering in which the controller applies spatial audio filters (e.g., HRTFs) to audio signals to produce binaural signals (e.g., a left audio signal for the left audio receiver device 12 and a right audio signal for the right audio receiver device). These binaural signals cause the speakers to produce spatial audio cues to give a user the perception that sounds are being emitted from a particular location within an acoustic space. In one aspect, the filters may be personalized for the user of the audio receiver device(s) in order to account for the user's anthropometrics. In one aspect, each audio receiver device may separately spatially render received audio data. While in some aspects, the controller 48 of the audio source may perform spatial rendering upon the input audio signal 46 and transmit the spatially rendered audio data the audio receiver device(s) for output.

In another aspect, the audio source device 10 may transmit a control message that includes data that represents audio data to be played back at the audio receiver device 12. For instance, the audio source device may optically transmit metadata associated with one or more sounds, such as a musical instrument digital interface (MIDI) message. Upon receiving the MIDI message, the audio receiver device 12 may synthesize a sound associated with data within the message. Specifically, the audio receiver device may be configured to produce an audio signal that contains synthesized sound according to data within the MIDI message, and use the audio signal to drive the speaker 68. In one aspect, the audio source device 10 may transmit control messages in addition to (or in lieu of) sending audio data to the receiver device 12. For instance, rather than sending the input digital audio signal as audio data, the source device 10 may transmit messages via the optical transmitter (e.g., as one sample or bit at a time). As a result, rather than optically transmitting the audio data to be played back by the audio receiver device, metadata associated with the audio data may be transmitted, this as a result may further reduce latency.

Figure 3B:
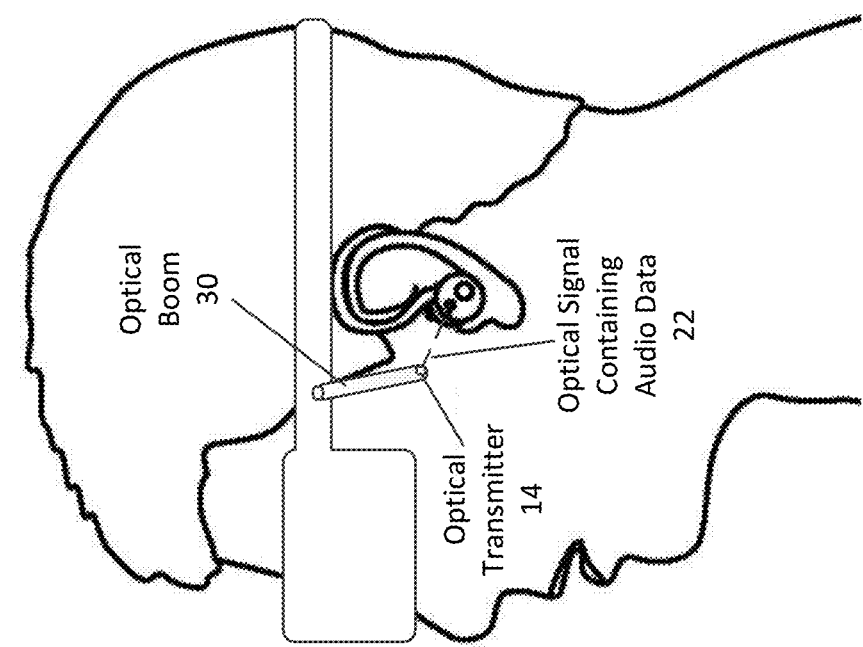
FIGS. 3A and 3B show different examples of the audio source device.
Figure 3A:
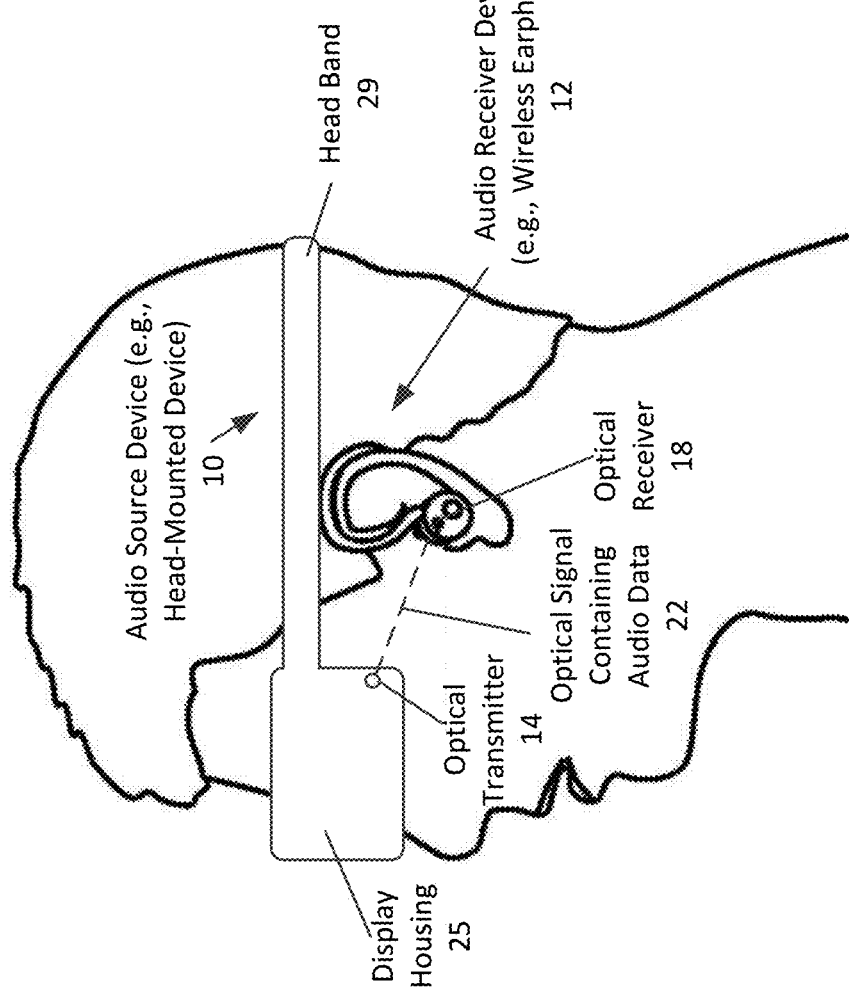

FIGS. 3A and 3B illustrate different examples of the audio source device 10. For instance, FIG. 3A shows the audio source device 10 as a head-mounted device (HMD) that is worn on a head of the user 8. In this figure, the optical transmitter 14 is positioned on a display housing 25 of the HMD 10. In one aspect, the HMD 10 may include two or more transmitters 14, that are each positioned at different locations on the display housing 25 and/or the head band 29 of the HMD 10. In this way, the HMD 10 may transmit identical (or similar) audio streams as two or more optical signals. Thus, if the reception quality of a first optical signal produced by a first transmitter degrades (e.g., becomes obstructed), a second optical signal produced by a second optical transmitter may compensate for any audio data not received from the obstructed first transmitter. More about transmitting audio data via one or more optical transmitters based on reception quality is described herein. In another aspect, instead of transmitting the same audio data in different optical signals, two or more optical transmitters may transmit different audio streams to the audio receiver device 12.

Although the optical transmitter 14 of the HMD 10 and the optical receiver 18 of the audio receiver device 12 are illustrated as circles, in one aspect the transmitter and/or receiver may be underneath an outer surface of either device. For instance, a thin layer of plastic may be overlaid on top of the optical transmitter in order to mask its position. The optical signal 22 produced by the transmitter 14 may not be affected. In one aspect, the surface may be any non-electrically conductive material, such as plastic and glass that does not interfere with certain wavelengths of light (e.g., infrared).

FIG. 3B shows a HMD 10 that includes an optical transmitter 14 that is positioned on an optical transmitter boom 30. The boom 30 is configured to be positioned close to the optical receiver 18 of the audio receiver device in order to reduce a distance between the optical transmitter 14 and the receiver 20. Reducing this distance may avoid potential obstructions (e.g., user hair) from obstructing the line of sight between the transmitter 14 and the receiver 20. Moreover, reducing the distance between the transmitter and receiver may reduce any interference that may be caused by ambient light (e.g., sunlight, etc.). Therefore, reducing the distance may result in maintaining a high reception quality.

In one aspect, the optical transmitter 14 may be configured to produce an optical signal that is at least partially injected into an object (e.g., human tissue), such that the optical receiver 18 of the audio receiver device 20 senses an out-coupled optical signal from the object. Specifically, the optical transmitter 14 of the source device may be positioned behind the user's pinna (e.g., and may come into contact with the pinna). On the other side of the user's pinna may be the optical receiver 18 of the receiver device 20. Thus, the optical transmitter 14 is configured to emit modulated light through or into the pinna, and the optical receiver is configured to sense the modulated light that is out-coupled through the pinna. In one aspect, such a configuration would reduce any susceptibility to ambient light and any objects that may otherwise block the optical signal (e.g., hair). More about transmitting the optical signal through human tissue is described in FIGS. 6 and 7.

As described herein, ambient light, such as sunlight, may interfere with audio optical reception. To reduce interference, in one aspect, a distance between the optical transmitter 14 and the optical receiver 18 may be reduced, as illustrated in FIGS. 3A and 3B. In one aspect, to reduce interference, the controller 58 may perform additional operations to discriminate between an over-the-air optical signal 22 and ambient light. For example, the controller 58 may perform wavelength filtering to filter wavelengths of light that are not the intended optical signal. As another example, the controller 58 may perform AC coupling to filter out DC signal that would be produced by sun light. As another example, the (e.g., optical receiver 18 of the) audio receiver device 12 may include an ambient light sensor that produces sensor data that indicates how bright ambient light is within the environment. In one aspect, the optical receiver may use the sensor data to remove (or subtract) the ambient light from the received optical signal. In another aspect, if the brightness of the ambient light exceeds a threshold, the audio receiver device 12 may instruct the audio source device 10 to transition to a wireless RF signal. As another example, when the audio source device includes two or more optical transmitters, the audio receiver device may instruct the audio source device to switch between transmitters. More about switching between transmitters is described in FIG. 6. In one aspect, the user 8 may be informed (e.g., as alert audio via the speaker 68) that the ambient light is (or may) affect the optical audio transmission. The user 8 may then move indoors as a result.

Figure 4:
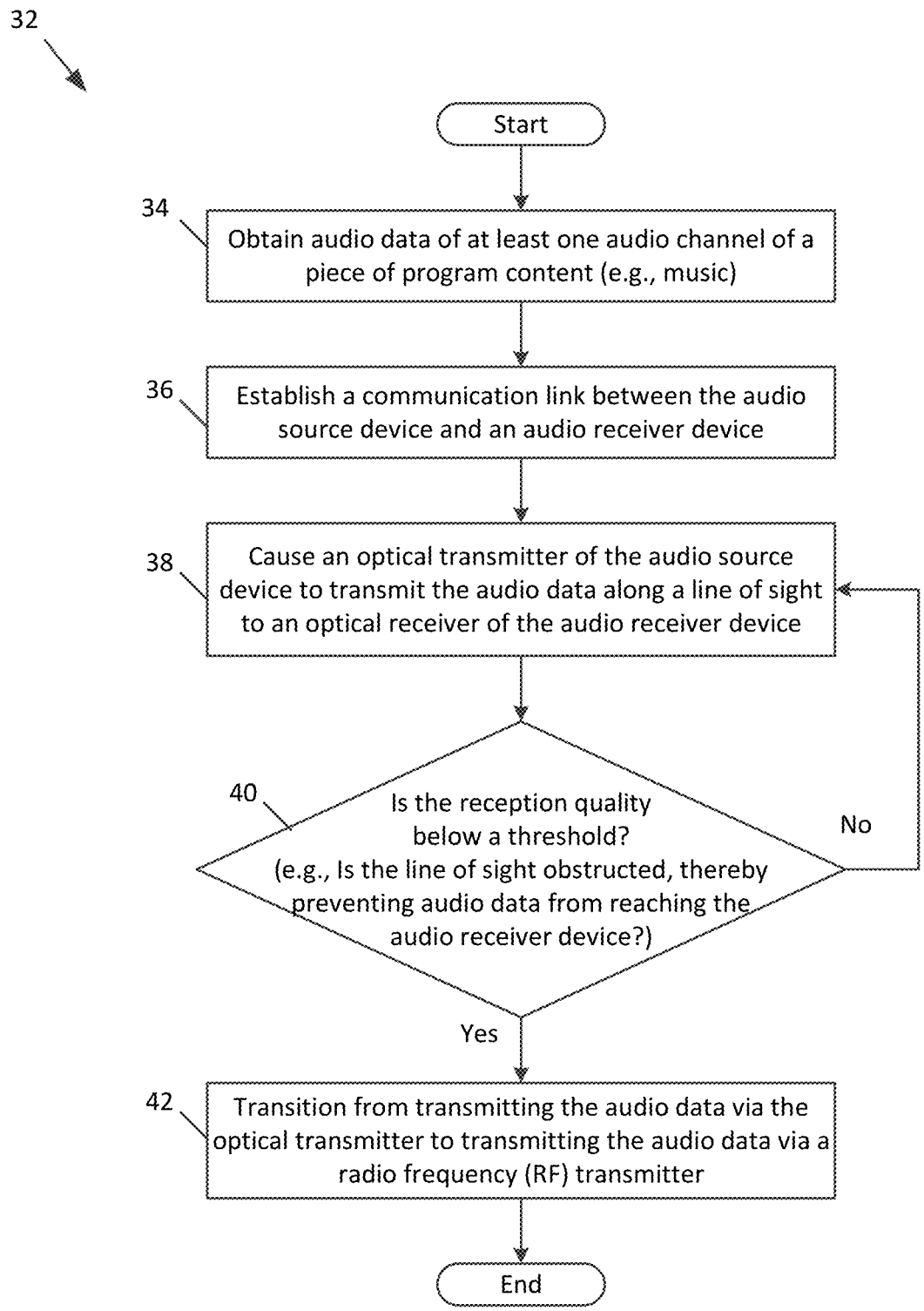
FIG. 4 is a flowchart of one aspect of a process to transition between transmitting audio data via an optical transmitter and via a RF transceiver.

FIG. 4 is a flowchart of one aspect of a process 32 to transition between transmitting audio data via an optical transmitter to transmitting the audio data via a RF transmitter. In one aspect, the process 32 is performed by the system 43 that includes the audio source device 10 and the audio receiver device 12. Specifically, at least some of the operations described herein may be performed by (e.g., a programmed processor) of the audio source device 10 and/or by (e.g., a programmed processor) of the audio receiver device 12. Thus, this figure will be described with reference to FIG. 1. The process 32 begins by obtaining audio data of at least one audio channel of a piece of user-desired audio program content, such as music (at block 34). Specifically, the audio source device 10 may retrieve the audio data from local memory and/or a remote source. For instance, the audio source device 10 may establish a wireless communication link with a wireless access point in order to exchange data (e.g., audio data) with an electronic server over a wireless network (e.g., the Internet). In another aspect, an application (e.g., media playback application) may transmit audio data (and/or a playback request) to the controller 48 for playback. The process 32 establishes a communication link between an audio source device 10 (e.g., smart glasses) and an audio receiver device (e.g., earphone 12) (at block 36). For instance, the audio source device 10 may form a wireless RF (e.g., BLUETOOTH) connection with the earphone. In one aspect, the connection may be in response to an automatic discovery process performed by the audio source device 10 and/or the audio receiver device 12. In one aspect, such a communication link is established automatically (e.g., without user intervention). In another aspect, the user 8 may manually establish the communication link (e.g., through a UI item displayed on the display screen 13 of the audio source device 10).

In one aspect, in lieu of (or in addition to) the RF connection, the communication link may be an optical communication link that is established in response to the audio source device 10 determining that the audio receiver device 12 is in a line of sight. For instance, the audio source device 10 may periodically (e.g., every second) transmit data via the optical transmitter 14. Once the audio receiver device is in a line of sight, the optical receiver 18 may receive the data and transmit a confirmation, via an RF transmitter to the audio source device 10. In one aspect, as described herein, the confirmation may be transmitted via an optical transmitter integrated into the audio receiver device.

In one aspect, the audio source device 10 may determine that the audio receiver device is in line of sight based on sensor data. For instance, the audio source device 10 may include a camera that is configured to produce image data that represents a scene in a field of view of the camera. The audio source device 10 may perform an object recognition algorithm upon the image data to detect an optical receiver (and/or an audio receiver device) within the scene. Once detected, the audio source device 10 may determine that the audio receiver device is in the line of sight. In another aspect, the audio source device 10 may obtain proximity sensor data that indicates a distance from which an object is from the device 10. The device 10 may determine the audio receiver device is in the line of sight upon determining that an object is within a threshold distance. In one aspect, the audio source device 10 may use any combination of methods to determine whether the audio receiver device is in the line of sight.

In one aspect, the operations to establish a communication link may be performed by the audio receiver device 12. For instance, the audio receiver device 12 may transmit the confirmation via the RF transmitter, upon determining that the audio source device 10 is within a line of sight.

The process 32 causes the optical transmitter 14 to transmit the audio data (e.g., along the line of sight) to the audio receiver device 12 (at block 38). For instance, the audio source device may cause the optical transmitter 14 to produce an over-the-air optical signal that contains the audio data. The process 32 determines whether the reception quality of the optical signal by the audio receiver device 12 is below a threshold (at decision block 40). Specifically, the audio source device determines whether the audio data should be transmitted via an over-the-air RF transmitter, while transmitting the audio data as the over-the-air optical signal. In one aspect, the audio source device 10 may perform this determination by determining whether the line of sight with the audio receiver device is obstructed, thereby preventing audio data contained within the optical signal from reaching the optical receiver 18 of the audio receiver device 12. For instance, the audio source device 10 may use the sensor data to determine whether an object is obstructing the line of sight for a period of time (e.g., one second, two seconds, three seconds, etc.). As an example, the audio source device 10 may use the image data captured by the device's camera to determine whether an object within the field of view of the camera is in the line of sight. In one aspect, if the object obstructs the line of sight for at least the period of time, the reception quality may be determined to be poor, since no audio data is being received by the audio receiver device, and therefore is below the threshold.

In one aspect, the reception quality may be based on environmental conditions within the environment in which the audio source device 10 is located. For instance, ambient light, such as sun light includes infrared light and some artificial light (e.g., light produced by fluorescent lamps) may produce high frequency modulated light. Depending on the distance between the optical transmitter 14 of the audio source device 10 and the optical receiver 18 of the audio receiver device, and/or the intensity of the ambient light, the ambient light may interfere with the optical transmission, or more specifically the ambient light may interfere with audio receiver device's reception of the optical signal by introducing light noise. As described herein, the audio source device 10 may include an ambient light sensor that includes a photodiode. In one aspect, the audio source device 10 may measure the ambient light via the ambient light sensor and when the ambient light is above a threshold intensity, it may be determined that the reception quality may be negatively affected. Thus, the reception quality may degrade below the threshold based on the ambient light intensity. In one aspect, to further determine the impact of the ambient light, the audio source device 10 may take into account the distance between the audio receiver device and the audio source device.

In another aspect, the determination of whether the reception quality is below the threshold may be performed by the audio receiver device 12. For instance, the audio receiver device may determine that an object is obstructing the line of sight from the audio source device, upon determining that the optical receiver 18 is no longer receiving an optical signal from the source device. The audio receiver device may determine that the reception quality is below the threshold upon determining that the optical signal has not been obtained for at least a threshold period (e.g., one second, etc.). In another aspect, the audio receiver device may perform any of the operations described herein performed by the source device to make this determination. Upon determining that the reception quality is below the threshold, the audio receiver device 12 may transmit a control message via a RF transmitter indicating that the quality is below the threshold.

Returning to process 32, if the reception quality is not below the threshold, the process 32 returns to block 38 in order to continue to cause the optical transmitter to optically transmit the audio data. If, however, the reception quality is below the threshold (e.g., based on a determination by the audio receiver device 12), the process 32 transitions from transmitting the audio data via the optical transmitter to transmitting the audio data via a RF transceiver (at block 42). Thus, the audio source device 10 performs the transition in response to determining that the audio data should be transmitted via the over-the-air RF transceiver 16. The audio source device 10 performs the transition by ceasing to drive the optical transmitter and beginning to transmit the audio data as data packets over a wireless RF signal using a wireless communication protocol, such as BLUETOOTH. In one aspect, BLUETOOTH may be a preferable protocol because BLUETOOTH has a low energy requirement, as opposed to other wireless communication methods (e.g., WLAN). In one aspect, there may be overlap between both transmissions during the transition. For instance, the source device 10 may continue to transmit audio data via the optical transmitter for a period of time (e.g., one second, two seconds, etc.) after the source device begins to transmit audio data via the RF transceiver. This overlap may ensure that there is no discontinuity during sound playback by the audio receiver device.

In one aspect, the transition may be a (almost) seamless transition. In this case, in order to minimize any artifacts, the audio source device 10 may transmit at least a portion of the audio data that is being optically transmitted, via the over-the-air RF signal. Thus, the audio receiver device 12 may buffer a portion of the audio data, and in response to not detecting the optical signal the audio receiver device 12 may begin to draw audio data from the buffer.

In one aspect, the controller 48 may perform mixing operations when audio data is being transmitted via the RF signal 54 and the optical signal 22. For instance, as described herein, the audio source device 10 may transmit different (or similar) audio data via both signals. Upon performing the transition, the controller 48 may mix audio data of the low-latency path 52 with audio data of the high-latency path 50, and transmit the mix via the RF transmitter 16.

Some aspects perform variations of the process 32. For example, the specific operations of the process 32 may not be performed in the exact order shown and described. The specific operations may not be performed in one continuous series of operations and different specific operations may be performed in different aspects. For example, the process may establish the communication link (at block 36) before (or contemporaneously) with obtaining the audio data (at block 34). As another example, as described herein, the audio source device 10 may transmit the same audio data via the RF transceiver 16 and the optical transmitter 14. The audio receiver device 12 may receive the audio data via optical and RF transmission, and choose which audio data is to be used to drive the speaker 68. For instance, the audio receiver device 12 may use the optically transmitted audio data to drive the speaker 68. When the reception quality is below the threshold, the audio receiver device 12 may switch between the audio data that is optically obtained to the audio data that is being RF transmitted.

FIG. 5 illustrates an audio source device 10 that transitions from transmitting audio data via optical audio transmission to transmitting the audio data via a wireless RF signal. Specifically, this figure illustrates three stages 2, 4, and 6 in which the audio source device 10 (illustrated as a smart phone that includes a display screen 13 integrated therein) performs the transition in response to the line of sight 24 between the optical transmitter 14 of the audio source device 10 and the audio receiver device 12 (illustrated as a wireless earphone) being interrupted (or obstructed).

Stage 2 shows that the audio source device 10 has established a communication link with the audio receiver device 12 in order to exchange audio data. The optical transmitter 14 of the audio source device 10 is transmitting audio data as an optical signal 22 that is being received by the optical receiver 18 of the audio receiver device. In this figure, the audio data in the optical signal 22 is an audio portion of user-desired media content (e.g., an electronic game), where a user interface (UI) portion of the video game is being played back on the display screen 13 of the audio source device 10 to provide visual feedback. Thus, the optical signal 22 is establishing an over-the-air (or wireless) connection (e.g., pairing) the audio source device 10 with the audio receiver device 12. During this established connection with the audio source device, the audio receiver device may receive audio data (e.g., audio feedback of the electronic game) for playback through the audio receiver device's speaker. In one aspect, the optical signal 22 may include additional data (e.g., control messages, etc.).

Stage 4 shows that the line of sight between the (e.g., optical transmitter 14 of the) audio source device 10 and the (e.g., optical receiver 18 of the) audio receiver device 12 has been interrupted 24. Specifically, the user's head has turned to the left by 90 degrees, resulting in the user's head blocking the optical signal 22 from being received by the optical receiver 18. In one aspect, the audio receiver device 12 is configured to determine whether a reception quality of the optical signal is below a threshold. For example, the audio receiver device 12 may determine whether the optical signal containing the audio data has been interrupted for a threshold of time (e.g., one second, two seconds, three seconds, etc.). This determination may be based on the photodiode of the optical receiver 18 no longer producing a signal based on sensing light from the optical transmitter 14.

As illustrated, the audio receiver device 12 determines that the quality is below the threshold and as a result, transmits a control message 27 for the audio source device 10 to transition audio data transmission via the RF transceiver 16. Specifically, the audio receiver device 12 may transmit a data packet containing the control message using BLUETOOTH protocol via a RF transceiver to the audio source device 10.

Stage 6 shows the result of the audio source device 10 receiving the control message 27. Specifically, the audio source device has transitioned from transmitting the audio data as an optical signal 22 to transmitting the audio data as data packets via the RF transceiver 16 over a RF signal 26, using a wireless protocol. This stage also illustrates that the audio receiver device is receiving the RF signal containing the audio data 28, via the RF transceiver 20. Thus, the present disclosure provides a method of optical audio transmission to reduce transmission latency, and a method of transitioning to a wireless communication protocol when conditions for use of the optical audio transmission are not favorable.

As described thus far, the system 43 may be configured to transition between over-the-air optical transmission of audio data and over-the-air wireless RF transmission of the audio based on reception quality (at the audio receiver device). In one aspect, however, rather than (or in addition to) transitioning between these two forms of audio transmission, the system 43 may perform one or more adjustments to the optical transmission of the audio data based on the reception quality. This is especially the case when the system is transmitting audio data through human tissue. For example, the system may 1) adjust one or more parameters associated with one or more optical transmitters that are producing the optical signals, 2) may transition (or switch) between optical transmitters for producing the signals, 3) or a combination thereof. More about these operations are described herein.

Figure 6:
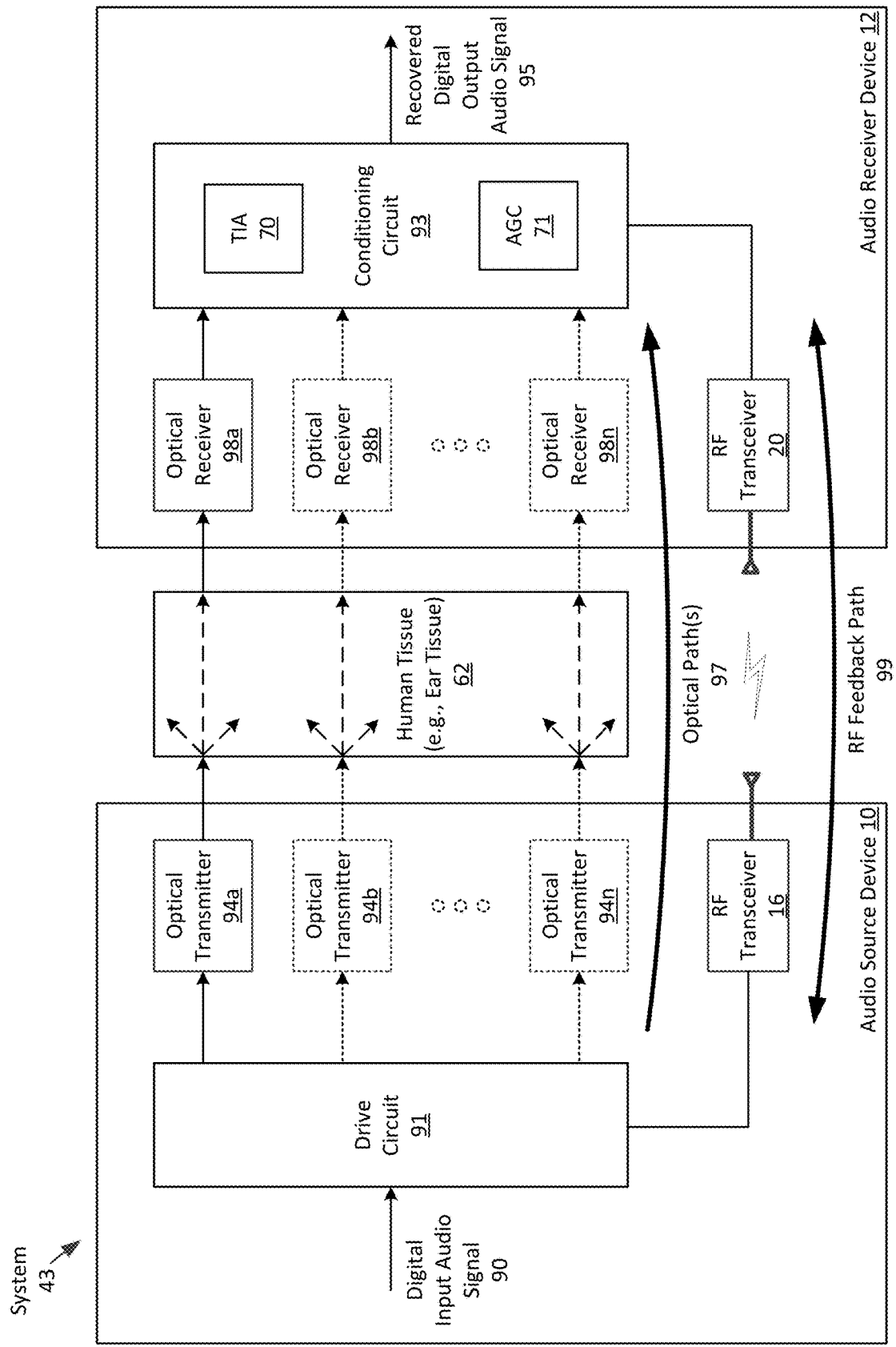
FIG. 6 is a block diagram of a system in which an audio source device optically transmits audio data to an audio receiver device through human tissue based on a RF feedback path according to another aspect of the disclosure.

FIG. 6 is a block diagram of the system 43 in which the audio source device 10 optically transmits audio data to the audio receiver device 12 through human tissue 62 according to another aspect of the disclosure. For example, this is a block diagram of the system illustrated in FIG. 7, in which the audio receiver device receives an optical signal that is transmitted by the audio source device through the user's ear 62. The audio source device 10 includes a drive circuit 91, one or more optical transmitters 94a-94n, and the RF transceiver 16; and the audio receiver device 12 includes a conditioning circuit 93, one or more optical receivers 98a-98n, and the RF transceiver 20. In one aspect, the drive circuit may be a part of controller 48, and thus the controller may perform at least some of the operations described herein with respect to the drive circuit. Similarly, the conditioning circuit 93 may be a part of controller 58, such that the controller 58 may perform at least some of the operations of the conditioning circuit. In one aspect, the drive circuit and/or conditioning circuit may be separate electronic components with respect to the controllers.

As illustrated, the system 43 is configured to produce one or more optical paths 97, each path produced by a respective optical transmitter in order to transmit audio data to the audio receiver device 12. A description of an optical path is as follows. The drive circuit 91 is configured to obtain a digital input audio signal 90. For example, signal 90 may be 1-bit samples of an input audio signal 90, such as samples 56 shown in FIG. 2. In another aspect, the signal may be serialized bits that include a sequence of one or more PCM samples of the audio signal, as described herein. The drive circuit is configured to modulate light output of the optical transmitter 94a (e.g., a LED) according to the signal 90. For example, the driver circuit may control an input drive current of the optical transmitter based on a current bit within the signal 90, as described herein. In response, the optical transmitter 94a produces modulated light that is emitted towards the human tissue 62 (e.g., ear tissue). In one aspect, when the light hits the tissue, at least some of the light may be reflected, scattered, and absorbed, while at least some of the light, however, is transmitted through and out of the human tissue. In one aspect, the optical signal (e.g., the modulated light) produced by the optical transmitter 94a may have a wavelength between 800 nm to 1150 nm.

The optical receiver 98a is configured to sense the modulated light produced by the optical transmitter 94a that is out-coupled through the human tissue. In one aspect, the optical receiver may include one or more photo sensors (e.g., photodiodes and/or phototransistors) that are each configured to sense the modulated light and produce an electrical signal (e.g., a current signal) based on the sensed light. The conditioning circuit 93 is configured to obtain the signal produced by the optical receiver 98a and is configured to produce a recovered digital output audio signal 95 based on the obtained signal. In one aspect, the recovered signal may be 1-bit samples of the audio signal, such as signal 56 illustrated in FIG. 2. For example, the recovered signal may be serialized bits that include a recovered sequence of one or more PCM samples of the audio signal, as described herein.

As shown, the conditioning circuit 93 includes a transimpedance amplifier (TIA) 70 and an automatic gain controller (AGC) 71, which are configured to produce the recovered audio signal. In particular, the TIA is configured to obtain the current signal produced by the optical receiver 98a and convert the current signal into a voltage signal. In one aspect, the amplitude of the current signal (and therefore the voltage signal) may vary based on modulated light sensed by the optical receiver. Specifically, the current produced by the optical receiver is proportional to the input optical (light) power level of the modulated light sensed by the receiver. Thus, in order to maintain a constant (or consistent) current signal the conditioning circuit includes the AGC. The AGC is configured to obtain the voltage signal, and is configured to regulate the amplitude of the signal. Specifically, the AGC dynamically adjusts the amplification (e.g., gain) of the voltage signal, such that an output signal (e.g., the recovered digital output audio signal 95) of the AGC has a suitable signal amplitude (e.g., an amplitude above (or within) a threshold). In one aspect, the threshold may be a predefined threshold.

In addition to the one or more optical paths 97, the system 43 also includes at least one wireless RF feedback path 99 through which the (conditioning circuit 93 of the) audio receiver device 12 transmits (via the RF transceiver 20) feedback data to the (drive circuit 91 of the) audio source device 10. In other words, the audio receiver device is configured to transmit feedback data as a wireless RF signal (e.g., RF signal 84) to the audio source device. In response, the drive circuit may become configured to adjust the optical transmission based on the feedback data, as described herein.

In one aspect, the audio receiver device 12 may transmit feedback data based upon the reception quality of the received optical signal. Specifically, the conditioning circuit 93 may be configured to determine the reception quality as the input optical power level of the out-coupled modulated light sensed by the optical receiver. If the power level is above a (first) predefined threshold, the audio receiver device becomes configured to transmit (e.g., a control signal containing) instructions for the drive circuit 91 to adjust one or more parameters of the optical transmitter 94a. For example, since the input optical power level is above a threshold, meaning that the modulated light may have a higher luminance then necessary for the audio receiver device to effectively recover the digital audio data (e.g., the AGC 71 may efficiently regulate the output audio signal below the threshold), the instructions may configure the drive circuit to reduce the optical transmitter's light output. Specifically, the circuit 91 may adjust (e.g., reduce) an output power level of the optical transmitter according to the input optical power level (or based on the difference between the threshold and the input optical power level). In one aspect, the drive circuit may adjust the output power by adjusting the drive current to the (e.g., light source of the) optical transmitter. By reducing the output power level, the audio source device is able to conserve battery power, while maintaining an optimal reception quality of the received optical signal. In one aspect, conversely however, if the input optical power level is below a (second) predefined threshold, the feedback data may instruct the audio source device to increase power output of the optical transmitter.

In one aspect, rather than (or in addition to) having instructions to adjust parameters of the optical transmitter (e.g., transmitter 94a), the feedback data may include instructions to add and/or remove optical paths based on reception quality. As described herein, the audio source device may include one or more optical transmitters 94a-94n, each for transmitting audio data via a respective optical path as modulated light. At any given time, the audio source device may transmit the audio data via one or more optical transmitters, while a remainder of the optical transmitters are redundant (e.g., not transmitting audio data). In the present example, only optical transmitter 94a is transmitting an optical signal, while transmitters 94b-94n are redundant. In one aspect, the conditioning circuit 93 is configured to determine whether the reception quality of the optical path being produced by the transmitter 94a is below a threshold, as described herein. In response to the reception quality being below a threshold, the audio receiver device may transmit instructions as feedback data to cause the audio source device to transition from using the optical transmitter 94a to produce a (first) optical signal as modulated light to using another (or at least one other) optical transmitter (e.g., transmitter 94b) to produce a (second) optical signal as the modulated light. Thus, in some cases, some optical transmitters may produce a more favorable optical path then others. For instance, optical transmitter 94b may produce a better optical path then an optical path produced by optical transmitter 94*a* (e.g., having a higher reception quality). This may be due to the transmission paths themselves. For example, the optical path produced by transmitter 94*b* may pass through a thinner portion of human tissue 62 then the optical path produced by transmitter 94*a*. As a result, transmitter 94*b*'s path may have a higher input optical power level (since less modulated light is absorbed by the thinner portion), then an input optical power level of transmitter 94*a*'s path. Thus, it may be more desirable for the system 43 to transmit audio data via optical transmitter 94*b* then transmitter 94*a*.

In one aspect, the audio receiver device 12 is configured to determine which optical transmitter is to (or should) transmit the audio data based on a set up process. During the set up process, the audio source device 10 is configured to transmit a portion of audio data (or test data) from each of the optical transmitters 94*a*-94*n* over a period of time. In addition, the audio source device is also configured to transmit identification data, via the RF feedback path 99, that indicates which optical transmitter is producing a respective optical signal over a given period of time. Thus, the audio receiver device is configured to obtain, from each of (or at least some of) the optical transmitters of the audio source device, audio data as a respective optical signal. The audio receiver device determines, for each of the respective optical signals, a reception quality, and associates the determined reception qualities with the respective optical transmitter's identification data (e.g., in a data structure). Once each (or at least a portion) of the optical transmitters transmits a portion of data, the audio receiver determines which optical transmitter is associated with a higher (or better) reception quality with respect to the other determined reception qualities. The audio receiver is configured to select one of the optical transmitters (e.g., one of the optical transmitters that has transmitted a portion of audio data) with a highest reception quality. The audio receiver device 12 is configured to transmit instructions (e.g., as feedback data) back to the audio source device, via the RF feedback path, instructing the audio source device to transmit (future) audio data with the selected optical transmitter.

In one aspect, the system 43 may perform the set up process after the audio receiver device 10 (and/or the audio source device 10) is powered up, or after both devices establish a communication link, as described herein. In another aspect, the system may perform the set up process periodically (e.g., once a minute) in order to ensure that the audio data is being transmitted via an optimal optical path.

As described thus far, the system 43 may perform one or more operations to determine whether to adjust audio data transmission via one or more optical transmitters 94*a*-94*n*. In one aspect, the system may perform similar operations with respect to the optical receivers 98*a*-98*n*. For example, as illustrated, each optical path 97 includes an optical transmitter (e.g., 94*a*) that transmits an optical signal to a corresponding optical receiver (e.g., 98*a*). In one aspect, however, the audio receiver device 10 may obtain audio data from any of the optical receivers 98*a*-98*n*, regardless of which optical transmitter is currently producing the optical signal. The audio receiver device may determine which one (or more) optical receivers are used to obtain the audio data based on which receiver is associated with a highest reception quality, as described herein. In one aspect, the audio receiver device may have a same (or different) number of optical receivers than a number of optical transmitters of the audio source device.

Figure 7:
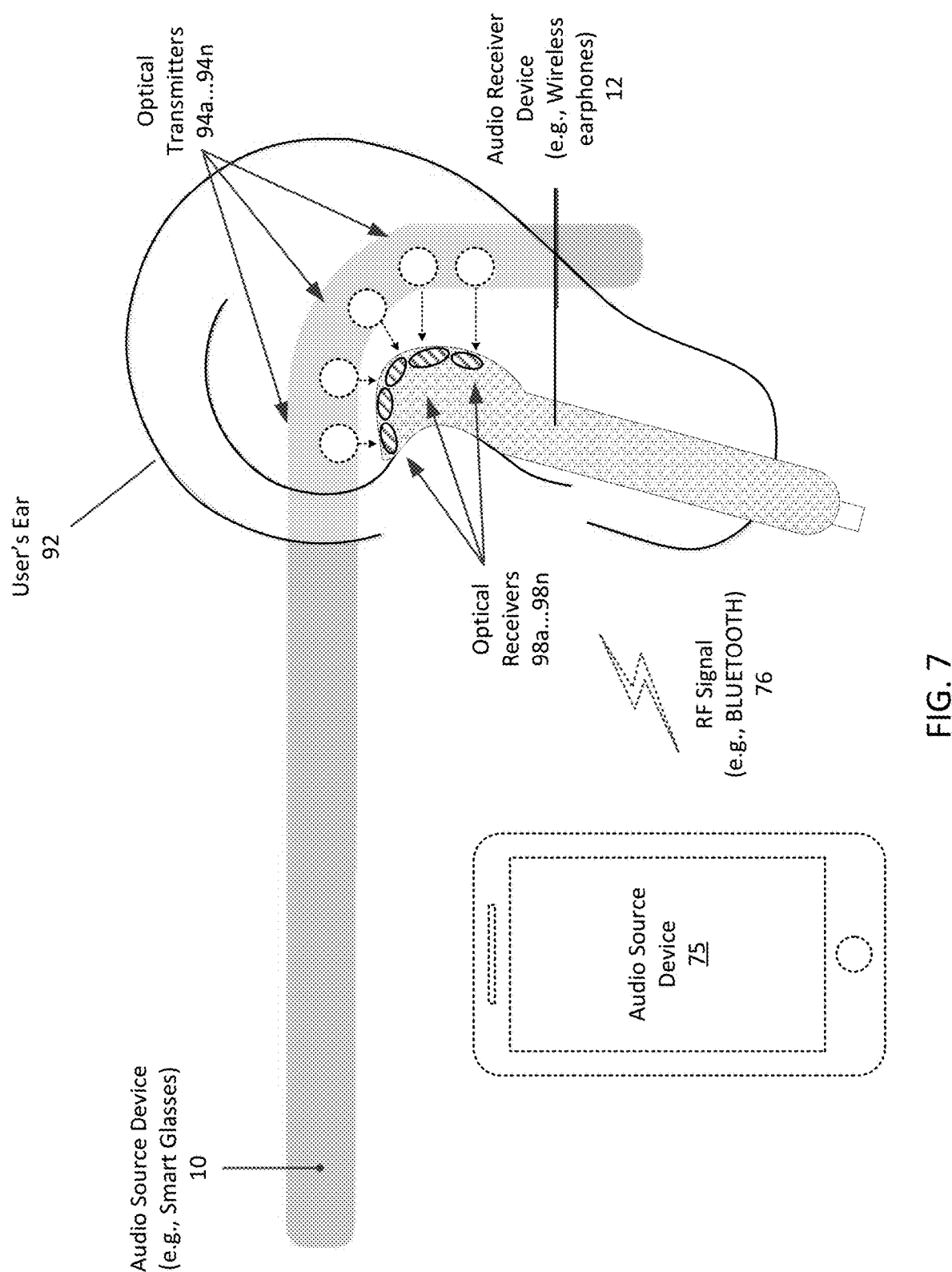
FIG. 7 shows an example of the system that optically transmits audio data through human tissue.

FIG. 7 shows an example of the system that optically transmits audio data through human tissue, specifically a user's ear 92. Specifically, this figure shows that the audio source device 10 is a HMD (e.g., a pair of smart glasses) that is being worn by the user, such that the temple (or more particularly the temple tip) is resting behind the user's ear 92. The source device includes several (over-the-air) optical transmitters 94*a*-94*n* that are positioned adjacent to the conchal eminence and ponticulus of the user's ear 92. The audio receiver device 12 is a wireless earphone that is inserted into the user's ear. More specifically, the receiver device is resting on the outer concha of the ear such that each of the optical receivers 98*a*-98*n* are positioned adjacent to the concha of the user's ear. In this way, at least one of the optical transmitters produces an optical signal that is received by at least one of the optical receivers in order to transmit low-latency audio data for playback by the audio receiver device, as described herein.

In one aspect, the audio receiver device 12 may receive audio data from one or more devices via one or more optical paths and/or one or more wireless RF paths. In particular, this figure shows an (optional) audio source device 75 (e.g., a smart phone) that is configured to transmit (high-latency) audio data to the audio receiver device via a wireless RF signal. Thus, the audio receiver device may obtain the low-latency audio data from the audio source device, and may obtain high-latency audio data from the second device 75 (e.g., via RF transceiver 20), such that the device becomes configured to drive at least one speaker with a mix of the low-latency audio data and the high-latency audio data.

According to one aspect, a method performed by an audio source device includes obtaining audio data; transmitting, via an over-the-air optical transmitter, the audio data as an over-the-air optical signal to an audio receiver device; while transmitting the audio data as the over-the-air optical signal, determining whether the audio data should be transmitted via an over-the-air radio frequency (RF) transmitter; and in response to determining that the audio data should be transmitted via the over-the-air RF transmitter, transitioning transmission of the audio data from the over-the-air optical transmitter to the over-the-air RF transmitter. In one aspect, transmitting the audio data as the over-the-air optical signal comprises using a pulse-density modulator to produce a digital driver signal from the audio data to operate the over-the-air optical transmitter. In another aspect, the over-the-air optical transmitter produces the over-the-air optical signal using amplitude modulation according to the digital driver signal. In yet another aspect, the over-the-air optical transmitter produces the over-the-air optical signal using wavelength modulation according to the digital driver signal. In some aspects, the over-the-air optical signal has a wavelength between 1200-1400 nm. In one aspect, determining whether the audio data should be transmitted via the over-the-air RF transmitter comprises obtaining a control message from the audio receiver device instructing the audio source device to transition from transmitting the audio data as the optical signal to transmitting the audio data as data packets over a wireless signal via the over-the-air RF transmitter. In another aspect, obtaining the control message comprises obtaining, via a RF receiver, a wireless signal containing the control message. In some aspects, the audio data has low-latency requirements. In one aspect, the method further comprises transmitting, via the RF transmitter, additional audio data that does not have low-latency requirements as data packets over a wireless signal to the audio receiver device. In some aspects, transitioning transmission comprises mixing the audio data that has the low-latency requirements with the additional audio data that does not have the low-latency requirements to produce a mix for transmission as data packets over the wireless signal.

An aspect of the disclosure may be a non-transitory machine-readable medium (such as microelectronic memory) having stored thereon instructions, which program one or more data processing components (generically referred to here as a "processor") to perform the network operations, signal processing operations, and audio processing operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A system comprising:
a head-mounted device (HMD) configured to obtain audio data of at least one audio channel of a piece of program content, wherein the HMD has 1) an optical transmitter for transmitting the audio data as an optical signal and 2) a first radio frequency (RF) transceiver; and
a wireless earphone having 1) an optical receiver for receiving the optical signal, 2) a second RF transceiver for transmitting feedback data indicating a reception quality of the received optical signal at the wireless earphone as a wireless RF signal, and 3) a speaker for outputting the audio data contained within the optical signal,
wherein, while the HMD and the wireless earphone are worn by a user, the optical transmitter is positioned on one side of a pinna of one of the user's ears and the optical receiver is positioned on another side of the pinna.

2. The system of claim 1, wherein the optical transmitter transmits a 1-bit sample of the audio data at a time as an over-the-air optical signal.

3. The system of claim 1, wherein the optical transmitter transmits the optical signal that has a wavelength between 1200-1400 nm.

4. The system of claim 1, wherein the optical transmitter is configured to produce the optical signal as modulated light, wherein the optical receiver is configured to receive the optical signal by sensing the modulated light that is out-coupled through the pinna.

5. The system of claim 4, wherein the produced optical signal has a wavelength between 800-1150 nm.

6. The system of claim 4,
wherein the wireless earphone is configured to determine the reception quality as an input optical power level of the modulated light sensed by the optical receiver,
wherein the HMD is configured to adjust an output power level of the optical transmitter according to the input optical power level.

7. The system of claim 4, wherein the optical transmitter is a first optical transmitter and the optical signal is a first optical signal, wherein the HMD has a second, redundant, optical transmitter that is for transmitting the audio data as a second optical signal, wherein the HMD is configured to, in response to the reception quality being below a threshold, transition from using the first optical transmitter to produce the first optical signal as the modulated light to using the second optical transmitter to produce a second optical signal as the modulated light.

8. The system of claim 1, wherein the the audio data is low-latency audio data; and the wireless RF signal is a first wireless RF signal, wherein the system further comprises an audio source device configured to transmit high-latency audio data to the wireless earphone as a second wireless RF signal, such that the wireless earphone becomes configured to drive the speaker with a mix of the low-latency audio data and the high-latency audio data.

9. The system of claim 1, wherein the audio data is transmitted as a musical instrument digital interface (MIDI) message, wherein the wireless earphone is configured to
produce an audio signal that contains synthesized sound according to the MIDI message; and
use the audio signal to drive the speaker.

10. A head-mounted device (HMD) comprising:
an over-the-air optical transmitter;
a processor; and
a memory having instructions stored therein which when executed by the processor causes the electronic device to:
obtain audio data that contains at least one audio channel of a piece of program content; and
transmit, via the over-the-air optical transmitter of the HMD, the audio data over an optical path to wireless headphones for playback through at least one speaker of the wireless headphones, while the HMD and wireless headphones are worn by a user.

11. The HMD of claim 10, wherein the memory has further instructions to
receive, as a wireless radio frequency (RF) signal and from the wireless headphones, feedback data indicating reception quality of the optical path, and adjust the transmission of the audio data based on the feedback data.

12. The HMD of claim 11, wherein the over-the-air optical transmitter is a first over-the-air optical transmitter and the optical path is a first optical path, wherein the HMD further comprises a second over-the-air optical transmitter, wherein the instructions to adjust the transmission of the audio data comprises instructions to transition from transmitting the audio data over the first optical path via the first over-the-air optical transmitter to transmitting, via the second over-the-air optical transmitter, the audio data over a second optical path to the wireless headphones.

13. The HMD of claim 11, wherein the optical path is modulated light that is produced by the over-the-air optical transmitter, wherein the reception quality is an input optical power level of the modulated light sensed by an optical receiver of the wireless headphones, wherein the instructions to adjust the transmission of the audio data comprises instructions to adjust an output power level of the over-the-air optical transmitter based on the input optical power.

14. The HMD of claim 10, wherein the over-the-air optical transmitter is coupled to an optical boom that is configured to position the optical transmitter within a threshold distance of an optical receiver of the wireless headphones in order to minimize the optical path.

15. The HMD of claim 11, wherein the optical transmitter transmits a 1-bit sample of the audio data at a time as an over-the-air optical signal.

16. A wireless earphone that is to be worn by a user comprising:
   a processor; and
   memory having instructions which when executed by the processor causes the earphone to
      obtain, using an over-the-air optical receiver, audio data as an optical signal that is transmitted from device head-mounted device (HMD) that includes an over-the-air optical transmitter configured to transmit the optical signal; and
      use the audio data to drive a speaker of the wireless earphone,
      wherein, while the HMD and the wireless earphone are worn by a user, the over-the-air optical transmitter is positioned on one side of a pinna of one of the user's ears and the over-the-air optical receiver is positioned on another side of the pinna.

17. The wireless earphone of claim 16, wherein the optical signal is modulated light produced by the over-the-air optical transmitter, wherein the instructions to obtain the audio data comprises sensing, using the over-the-air optical receiver, the modulated light that is out-coupled through the pinna.

18. The wireless earphone of claim 17, wherein the memory has further instructions to
   determine an input optical power level of the modulated light sensed by the over-the-air optical receiver; and
   transmit, using an over-the-air radio frequency (RF) transceiver, feedback data as a wireless RF signal to the HMD to configure the HMD to adjust an output power level of the over-the-air optical transmitter based on the input optical power level.

19. The wireless earphone of claim 16, wherein the memory has further instructions to
   obtain, from each of a plurality of over-the-air optical transmitters of the HMD, audio data as a respective optical signal;
   determine, for each of the respective optical signals, a reception quality;
   select one of the plurality of over-the-air optical transmitters with a highest reception quality with respect to each reception quality of the other over-the-air optical transmitters; and
   transmit, using an over-the-air radio frequency (RF) transceiver, feedback data as a wireless RF signal to the HMD to configure the HMD to use the selected over-the-air optical transmitter to transmit future audio data.

20. The wireless earphone of claim 16, wherein the obtained audio data is low-latency audio data, wherein the memory has further instructions to
   obtain, using an over-the-air RF transceiver and from an audio source device, high-latency audio data; and
   mix the low-latency audio data with the high-latency audio data to produce a mix that is to be used to drive the speaker.

21. The wireless earphone of claim 16, wherein the earphone is a first earphone, wherein the audio data comprises a first audio channel and a second audio channel of a piece of program content, wherein the memory has further instructions to
   use the first audio channel to drive a first speaker of the first earphone to output sound; and
   transmit the second audio channel to a second earphone to be used to drive a second speaker of the second earphone to output sound at least partially simultaneously with the output of sound by the first earphone.

22. The wireless earphone of claim 21, wherein the instructions to transmit the second audio channel comprises instructions to transmit the second audio channel via a near-field magnetic induction (NFMI) transmitter.

* * * * *